United States Patent
Bircann et al.

(10) Patent No.: US 6,759,934 B2
(45) Date of Patent: Jul. 6, 2004

(54) PROPORTIONALLY-CONTROLLABLE SOLENOID ACTUATOR

(75) Inventors: Raul A. Bircann, Penfield, NY (US); Melissa Bargmann, Rochester, NY (US); Dwight O. Palmer, Aiken, SC (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/004,638

(22) Filed: Dec. 5, 2001

(65) Prior Publication Data

US 2002/0060620 A1 May 23, 2002

Related U.S. Application Data

(63) Continuation-in-part of application No. 09/659,183, filed on Sep. 11, 2000, now abandoned.

(51) Int. Cl.[7] .............................. H01F 3/00; H01F 7/08
(52) U.S. Cl. .................. 335/255; 251/129.15; 335/279; 335/281
(58) Field of Search ................................ 335/255–281; 251/129.08, 129.09, 129.1, 129.15, 129.18

(56) References Cited

U.S. PATENT DOCUMENTS

| | | |
|---|---|---|
| 5,443,309 A | 8/1995 | Beck |
| 5,503,184 A | 4/1996 | Reinartz et al. |
| 6,189,519 B1 | 2/2001 | Press et al. |
| 6,202,697 B1 * | 3/2001 | Oyama et al. .......... 137/625.65 |
| 6,247,461 B1 | 6/2001 | Smith et al. |
| 6,344,783 B1 * | 2/2002 | Neuhaus et al. ............. 335/278 |
| 6,390,077 B1 | 5/2002 | Simpson et al. |
| 6,390,078 B1 | 5/2002 | Gee et al. |
| 6,422,245 B1 | 7/2002 | Song |
| 6,435,168 B1 | 8/2002 | Bircann et al. |
| 6,467,959 B1 | 10/2002 | Bircann |
| 6,497,225 B1 | 12/2002 | Bircann et al. |
| 6,604,542 B1 | 8/2003 | Bircann et al. |

* cited by examiner

*Primary Examiner*—Ramon M. Barrera
(74) *Attorney, Agent, or Firm*—Patrick M. Griffin

(57) ABSTRACT

A proportionally-controllable solenoid including primary and secondary pole pieces that surround an armature axially movable along an axial channel within the pole pieces. The pole pieces are separated axially by an air gap and are conically tapered toward the gap. The leading and trailing faces of the armature are substantially orthogonal to its direction of travel to minimize radial parasitic forces on these faces. Further, the armature is also lengthened such that the trailing face is always outside the axial channel in the secondary pole piece at all points of axial travel to minimize the pull-back effect of axial flux vectors on the trailing face.

7 Claims, 4 Drawing Sheets

PROPORTIONALLY-CONTROLLABLE SOLENOID ACTUATOR

CROSS-REFERENCE TO RELATED APPLICATIONS

This application is a Continuation-In-Part of a application, U.S. patent application Ser. No. 09/659,183, filed on Sep. 11, 2000 by R. A. Bircann et al., now abandoned.

TECHNICAL FIELD

The present invention relates to electric solenoids; more particularly, to solenoids which are useful as linear actuators of mechanical apparatus, for example, poppet valves; and most particularly, to an improved proportional solenoid actuator having a higher actuation force over an longer range of travel than a comparable prior art solenoid actuator.

BACKGROUND OF THE INVENTION

Solenoids are employed as actuators in many different applications. Within the automotive arts, solenoids are known to be used as linear actuators for, among others, braking systems, transmission systems, and gas management valves such as exhaust gas recirculation valves. In many such applications, the need is for a device to operate in an on/off mode, such as to actuate a valve between open and closed positions. In such solenoid applications, high response speed and high actuation force are generally desirable. In other applications, however, such as in metering the flow of gas through a poppet valve, proportional control of the valve pintle may be required, wherein the axial position of the valve head must be highly controlled at any desired location between fully open and fully closed.

Force and stroke of a solenoid are interrelated. Force is an important parameter because it overcomes all loads, including parasitic loads of friction, air resistance, mass (inertia), and return spring. Stroke is important, especially for a valve application, because (in the absence of flow passage limitations) the longer the stroke the greater the permissible flow control range of the valve.

The armature of a solenoid is subject to magnetic forces resulting from the magnetic field formed by the solenoid windings. At any point in the flux field entering or leaving the armature, the flux lines have both axial and radial vector components. In general, radial forces on the armature are parasitic, causing friction, and axial forces are beneficial; in some solenoids, the ratio between parasitic and axial forces may exceed 10:1. However, in proportional control solenoids, sensitive control is achieved by configuring the solenoid such that the pole pieces which magnetically engage the armature surround the armature. Further, the pole pieces may be tapered adjacent to the air gap between them such that magnetic saturation of the pole pieces is progressive as the armature slides within them, enhancing proportional control.

In a well-known configuration of a solenoid-actuated valve, the valve is opened by the action of the solenoid and is closed by a compressed return spring when the solenoid is de-energized. Therefore, the solenoid must overcome the resistance of the spring plus any pressure differential across the valve. In addition, in known solenoid actuators, the solenoid must overcome a phenomenon known in the art as magnetic "pull-back." A solenoid armature is not disposed symmetrically axially within the windings but typically has a "leading face," oriented toward the device to be actuated, recessed within the windings, and a "trailing face," oriented away from the device to be actuated. In a typical solenoid, when the solenoid is de-energized, the trailing face is at or near the corresponding axial face of the pole piece. When the solenoid is energized, the trailing face of the armature is drawn into the pole pieces. At all stages of axial travel of the armature, the trailing face is subject to axial magnetic flux which creates a parasitic restraining force. The strength of this force is non-linear and varies with the axial position of the armature. This pull-back force must be overcome in any proportional control scheme, and its strength and non-linearity make sensitive proportional control very difficult.

Further, radial parasitic forces are proportional to the armature area subject to radial flux vectors within the pole pieces. The cylindrical surface of the armature and also its leading (axial) face are both subject to such radial vectors.

The practical effect of these phenomena, especially in many automotive applications, has been to limit the use of solenoid actuators to applications requiring stroke lengths substantially less than 5 mm and requiring relatively low actuating forces.

What is needed is a proportionally-controllable solenoid actuator wherein pull-back force and radial parasitic forces are minimized to permit longer stroke lengths and higher actuating forces.

It is a principal object of the present invention to provide a proportionally-controllable solenoid actuator having a long stroke length.

It is a further object of the invention to provide a proportionally-controllable solenoid actuator having a high actuating force.

SUMMARY OF THE INVENTION

Briefly described, a proportionally-controllable solenoid actuator in accordance with the invention includes primary and secondary pole pieces that surround an armature axially movable along an axial channel within the pole pieces. The pole pieces are separated axially by an air gap and preferably are conically tapered toward the gap to cause progressive saturation with movement of the armature. The armature is substantially squared off on its leading and trailing faces, orthogonal to its direction of travel, to minimize radial parasitic forces on these faces. Further, the armature is also lengthened such that the trailing face is always outside the axial channel at all points of axial travel, to minimize the pull-back effect of axial flux vectors on the trailing face.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

Figure 1:
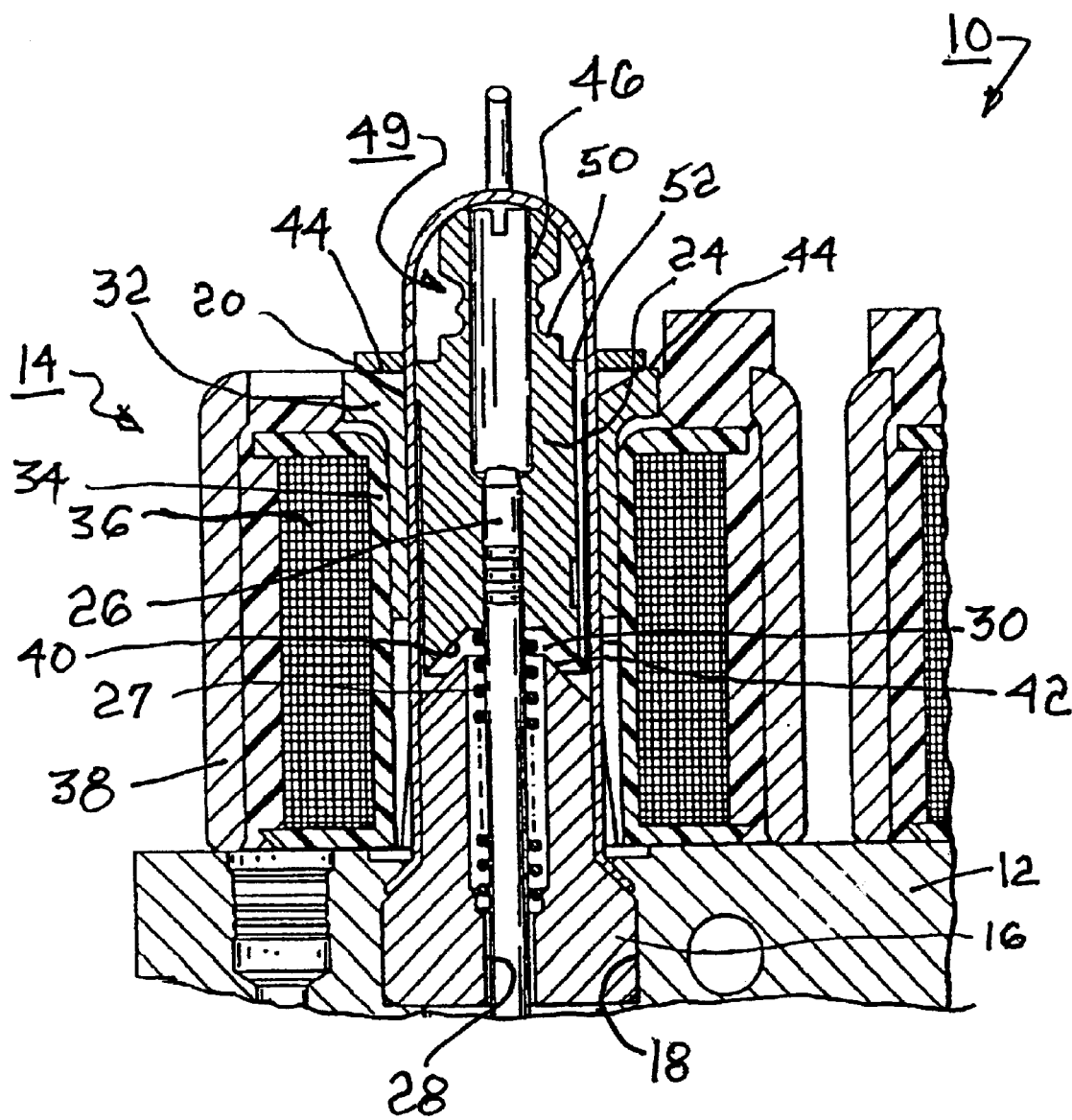
FIG. 1 is an elevational cross-sectional view of a solenoid actuated poppet valve assembly in accordance with the prior art.

Referring to FIG. 1, a prior art solenoid actuated poppet valve assembly 10 is shown substantially as disclosed in U.S. Pat. No. 5,433,309 ('309) issued Aug. 22, 1995 to Beck. Valve elements of the disclosure that are not relevant to the present discussion are omitted for clarity. Assembly 10 is shown in the solenoid de-energized position. Assembly 10 includes a valve body 12 supporting a solenoid actuator 14. Actuator 14 includes a primary pole piece 16, referred to in '309 as a "magnet core," disposed coaxially in a well 18 formed in valve body 12 and extending into a guide tube 20 slidably containing an armature 24. Armature 24 supports a valve pintle 26 extending through an axial bore 28 in primary pole piece 16 for actuating a valve head (not shown) in valve body 12. A return spring 27 disposed between pole piece 16 and armature 24 urges armature 24 away from pole piece 16 when the solenoid is de-energized. A gap 30 between pole piece 16 and armature 24 defines the length of stroke of actuator 14. Surrounding guide tube 20 is a secondary pole piece 32 separated from primary pole piece 16, a windings core 34, windings 36, and a housing 38. Guide tube 20 is disposed in an axial channel 21 formed in secondary pole piece 32.

Assembly 10 is said in '309 to be useful for proportional control of fluid flow through a valve. As shown in '309, the valve is open in the solenoid de-energized state and the solenoid actuator must overcome both the return spring and the hydraulic force of the flowing medium. The pressure drop across the valve increases as the valve closes, being maximized when the valve is fully closed and flow is deadheaded. It is recited in '309 that the truncated-cone relationship between armature 24 and pole piece 16, defining the shape of gap 30, confers a proportional relationship on the travel of the armature toward and away from the pole piece. However, the driving force for the armature is the axial magnetic attraction between the armature leading face 40 and the primary pole piece face 42, which force changes non-linearly and with a high and positive slope as a function of the axial dimension of gap 30. Further, the conical face 40 of armature 24 intercepts radial flux vectors, thus increasing parasitic losses from friction between the armature and the guide tube.

Further, armature 24 extends beyond the outer axial face 44 of secondary pole piece 32 in the form of an armature extension 46 having a crenelated axial profile 49. Reasons for the profile are not elaborated in the '309 disclosure; however, profile portions 50, 52 appear to be substantially orthogonal to the direction of travel of the armature and are close to face 44 and thus can be expected to contribute to parasitic force losses from magnetic pull-back. In fact, portion 52 in the solenoid rest position is nearly coplanar with pole piece face 44 and thus is particularly vulnerable to pull-back effect. Other, non-orthogonal portions of profile 49 are vulnerable to parasitic force loss from interception of radial flux vectors. Sensitive proportional control can be difficult to achieve with this actuator.

Figure 2:
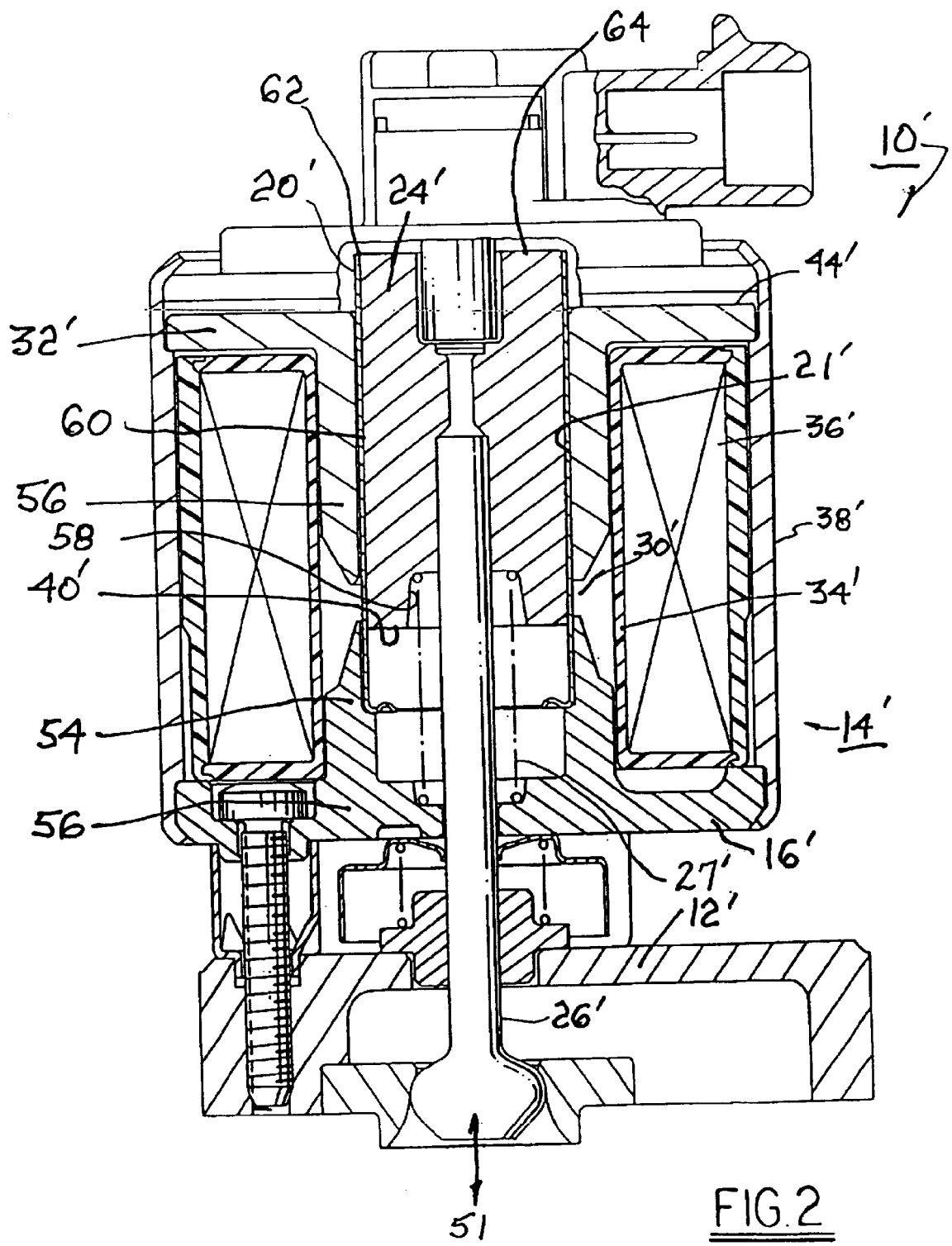
FIG. 2 is an elevational cross-sectional view of an improved proportionally-controllable solenoid actuated poppet valve in accordance with the invention.
Figure 3:
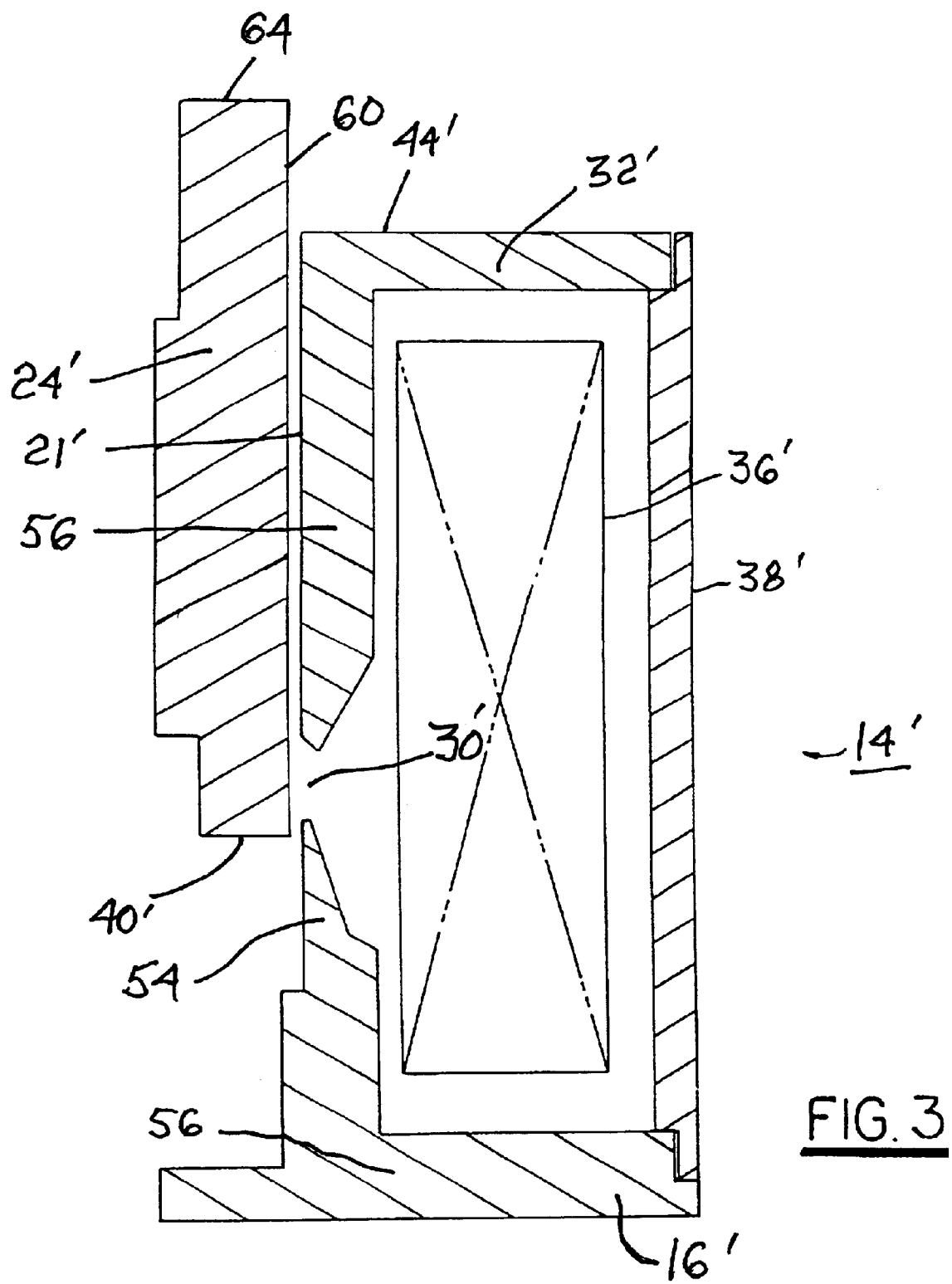
FIG. 3 is a detailed view of a portion of the solenoid shown in FIG. 2.

Referring to FIGS. 2 and 3, an improved proportionally-controllable solenoid actuated poppet valve assembly 10' in accordance with the invention includes an improved solenoid actuator 14' for controlling a valve which may be, for example, an exhaust gas recirculation valve for an internal combustion engine. Actuator 14' includes a conventional coil 36' wound on a core 34' and surrounded by a housing 38'. An armature 24' is disposed for sliding axial motion in a guide tube 20'. A primary pole piece 16' includes an annular portion 54 extending axially from a base portion 56 and surrounding the inner end of guide tube 20'. Portion 54 preferably overlaps slightly the leading edge 40' of armature 24' when the armature is in the rest position, as shown in FIGS. 2 and 3. Preferably, portion 54 is tapered as shown, preferably a conical taper. An improved secondary pole piece 32' is disposed surrounding guide tube 20', similar to the arrangement in the prior art, guide tube 20' being disposed in an axial channel 21' formed in the polepieces 16', 32'; however, portion 56 is tapered, opposite to portion 54, and an air gap 30' is provided therebetween. Tapering the two pole pieces as shown causes magnetic flux lines to be concentrated therebetween, creating an intense magnetic field in gap 30' and extending into armature 24' for axially urging armature 24' toward valve body 12' when the solenoid is energized.

Referring to armature 24', it can be seen that the armature differs from prior art armature 24 in at least three important ways, all of which serve to increase the working force of the solenoid by decreasing parasitic losses.

First, leading face 40' is squared off to be substantially orthogonal to the direction of travel 51 of pintle 26', thus minimizing radial flux vector losses. Well 58 for retaining and centering return spring 27' is substantially central to the armature and thus is exposed to primarily axial flux vectors. Leading face 40' may be slightly chamfered or radiused (not shown) where it meets side wall 60 of the armature, to facilitate assembly, without significant performance compromise.

Second, side wall 60 of the armature is extended beyond outer axial face 44' of secondary pole piece 32' such that the end 62 of side wall 60 does not break the plane of face 44' during the normal operational stroke of the solenoid.

Third, trailing face 64 of armature 24' is squared off to be substantially orthogonal to the direction of travel 51 of pintle 26', thus minimizing radial flux vector losses. Further, the combination of the length of side wall 60 extending beyond face 44' and the orthogonality of trailing face 64 minimizes parasitic losses from magnetic pull-back.

Figure 4:
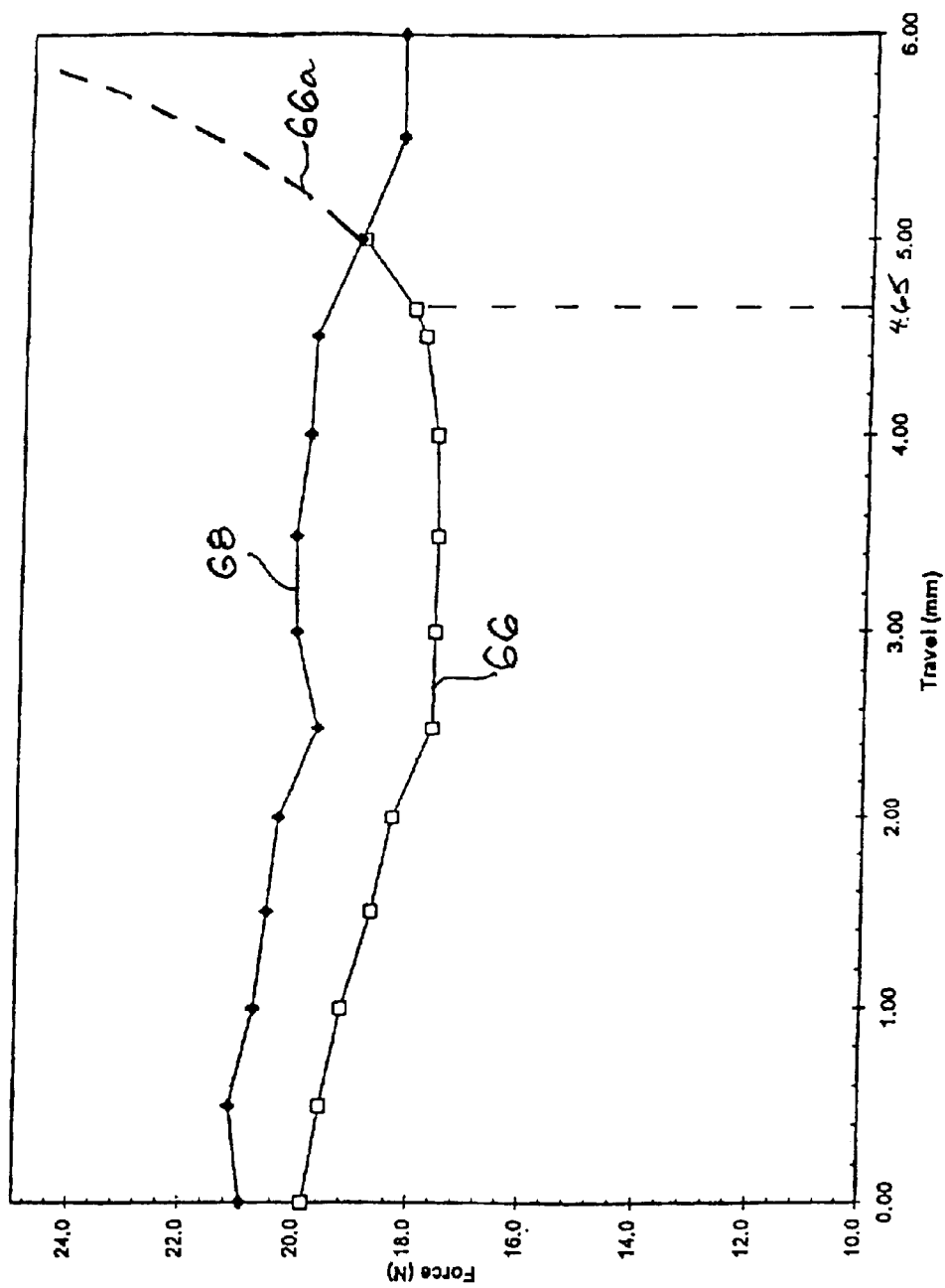
FIG. 4 is a graph showing actuating force and control range of both a proportionally-controllable solenoid actuated poppet valve in accordance with the invention and a prior art solenoid actuated poppet valve.

Referring to FIG. 4, the benefits of an improved solenoid actuator 14' in accordance with the invention are shown, the benefits being greater proportionally-controllable force over a greater range of actuation. Curve 66 represents force/distance data obtained from a prior art solenoid actuator. Curve 68 represents force/distance data obtained from a solenoid actuator in accordance with the invention. It is seen that the actuating force for curve 68 is consistently and significantly higher than for curve 66 over a solenoid operating stroke of 5.0 mm. However, the force shown in curve 66a at strokes greater than 4.64 mm represents a rapidly increasing component of axial flux as the armature approaches the primary pole piece, and such force is not readily controlled proportionally. Therefore, for proportional control, the prior art actuator is limited to strokes of less than 4.65 mm. On the other hand, the improved actuator is proportionally controllable over a stroke of at least 6.00 mm or even greater.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A solenoid actuator for linearly actuating a device, comprising:

a) a primary pole piece having a first annular portion;

b) a secondary pole piece having an outer axial face oriented away from said device and a second annular portion, said second portion being axially separated from said first portion to form an air gap therebetween;

c) an armature disposed for slidable axial motion within said first and second annular portions, said armature having a side wall terminating in a leading face oriented toward said device and a trailing face oriented away from said device, wherein said leading face and said trailing face are each substantially orthogonal to the direction of said axial motion, and wherein said trailing face remains outside said secondary pole piece at all axial positions of said armature; and d) a spring positioned between said primary pole piece and said armature.

2. A solenoid actuator in accordance with claim 1 wherein said first annular portion of said primary pole piece is tapered.

3. A solenoid actuator in accordance with claim 1 wherein said second annular portion of said secondary pole piece is tapered.

4. A poppet valve assembly for proportionally controlling flow of a fluid, the assembly including a solenoid actuator comprising:

a) a primary pole piece having a first annular portion;

b) a secondary pole piece having an outer axial face oriented away from said device and a second annular portion, said second portion being axially separated from said first portion to form an air gap therebetween;

c) an armature disposed for slidable axial motion within said first and second annular portions, said armature having a side wall terminating in a leading face oriented toward said device and a trailing face oriented away from said device, wherein said leading face and said trailing face are each substantially orthogonal to the direction of said axial motion, and wherein said trailing face remains outside said secondary pole piece at all axial positions of said armature; and d) a spring positioned between said primary pole piece and said armature.

5. A poppet valve assembly in accordance with claim 4 wherein said assembly is an exhaust gas recirculation valve and wherein said fluid is exhaust gas from an internal combustion engine.

6. A poppet valve assembly for proportionally controlling flow of a fluid, the assembly including a solenoid actuator comprising:

a) a primary pole piece having a first annular portion;

b) a secondary pole piece having an outer axial face oriented away from said device and a second annular portion, said second portion being axially separated from said first portion to form an air gap therebetween;

c) an armature disposed for slidable axial motion within said first and second annular portions, said armature having a side wall terminating in a leading face oriented toward said device and a trailing face oriented away from said device, wherein said leading face and said trailing face are each substantially orthogonal to the direction of said axial motion, and wherein said trailing face remains outside said secondary pole piece at all axial positions of said armature; and d) a pintle carried by said armature, said pintle extending through an axial bore in each of said primary pole piece and said secondary pole piece.

7. A solenoid actuator for linearly actuating a device, comprising:

a) a primary pole piece having a first annular portion;

b) a secondary pole piece having an outer axial face oriented away from said device and a second annular portion, said second portion being axially separated from said first portion to form an air gap therebetween, said second annular portion of said secondary pole piece being tapered; and c) an armature disposed for slidable axial motion within said first and second annular portions, said armature having a side wall terminating in a leading face oriented toward said device and a trailing face oriented away from said device, wherein said leading face and said trailing face are each substantially orthogonal to the direction of said axial motion, and wherein said trailing face remains outside said secondary pole piece at all axial positions of said armature.

* * * * *